2 Sheets, Sheet 1.

T. J. Kindleberger,

Cider Mill.

No. 2,332. Reissued Aug. 14, 1866.

Witnesses;

R. Mason
Atlanta

Inventor;
T. J. Kindleberger
by
D. P. Holloway & Co.
his attys

A.M. PHOTO-LITHO. CO. N.Y. (OSBORNE'S PROCESS)

2 Sheets, Sheet 2.

T. J. Kindleberger,

Cider Mill.

No 2,332. Reissued Aug. 14, 1866.

Witnesses;
Guy C. Humphries
L. Murphy

Inventor;
Tobias J. Kindleberger
by
D. B. Mallory & Co
his attorneys

AM. PHOTO-LITHO. CO. N.Y. (OSBORNE'S PROCESS)

UNITED STATES PATENT OFFICE.

TOBIAS J. KINDLEBERGER, OF EATON, (FORMERLY OF SPRINGFIELD,) OHIO.

CIDER-MILL.

Specification forming part of Letters Patent No. 12,953, dated May 29, 1855; Reissue No. 2,332, dated August 14, 1866.

*To all whom it may concern:*

Be it known that I, TOBIAS J. KINDLEBERGER, formerly of Springfield, Clarke county, Ohio, now of Eaton, Preble county, Ohio, have invented certain new and useful Improvements in Portable Cider Mills and Presses Combined; and I do hereby declare that the following is a full, clear, and exact description thereof, reference being had to the accompanying drawings, and to the letters of reference marked thereon, making part of this specification.

Similar letters, wherever they occur on the various figures, indicate similar parts.

Figure 1:
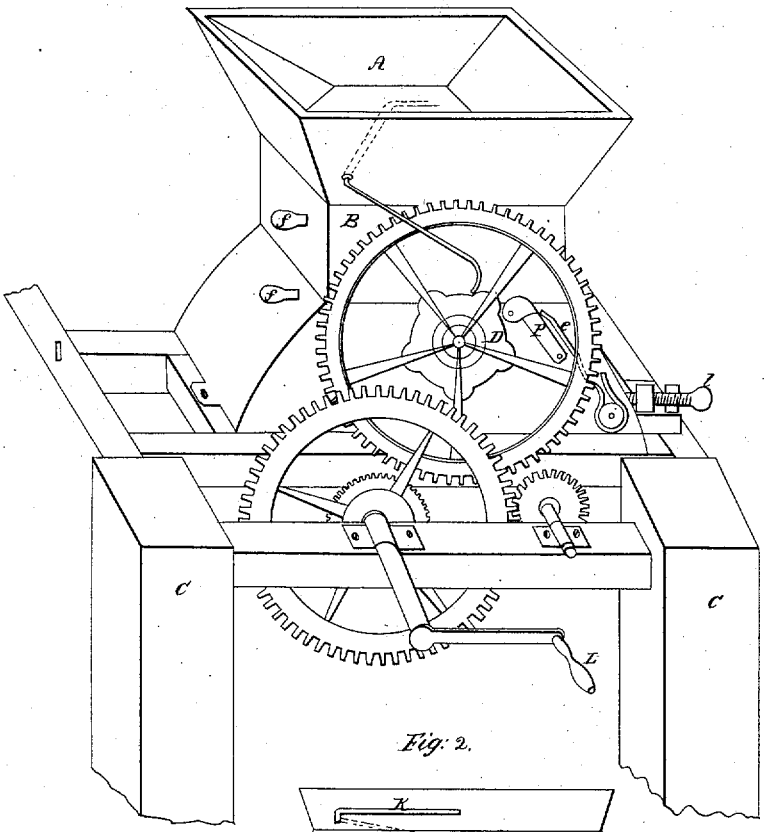
Figure 3:
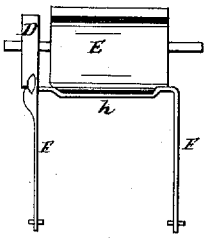
Figure 2:
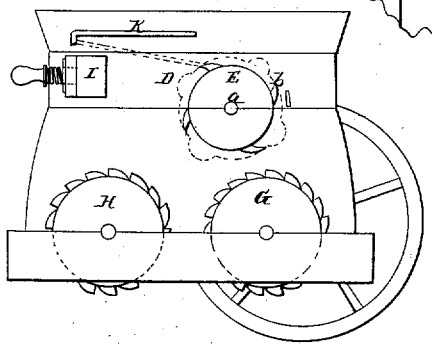
Figures 4, 5:
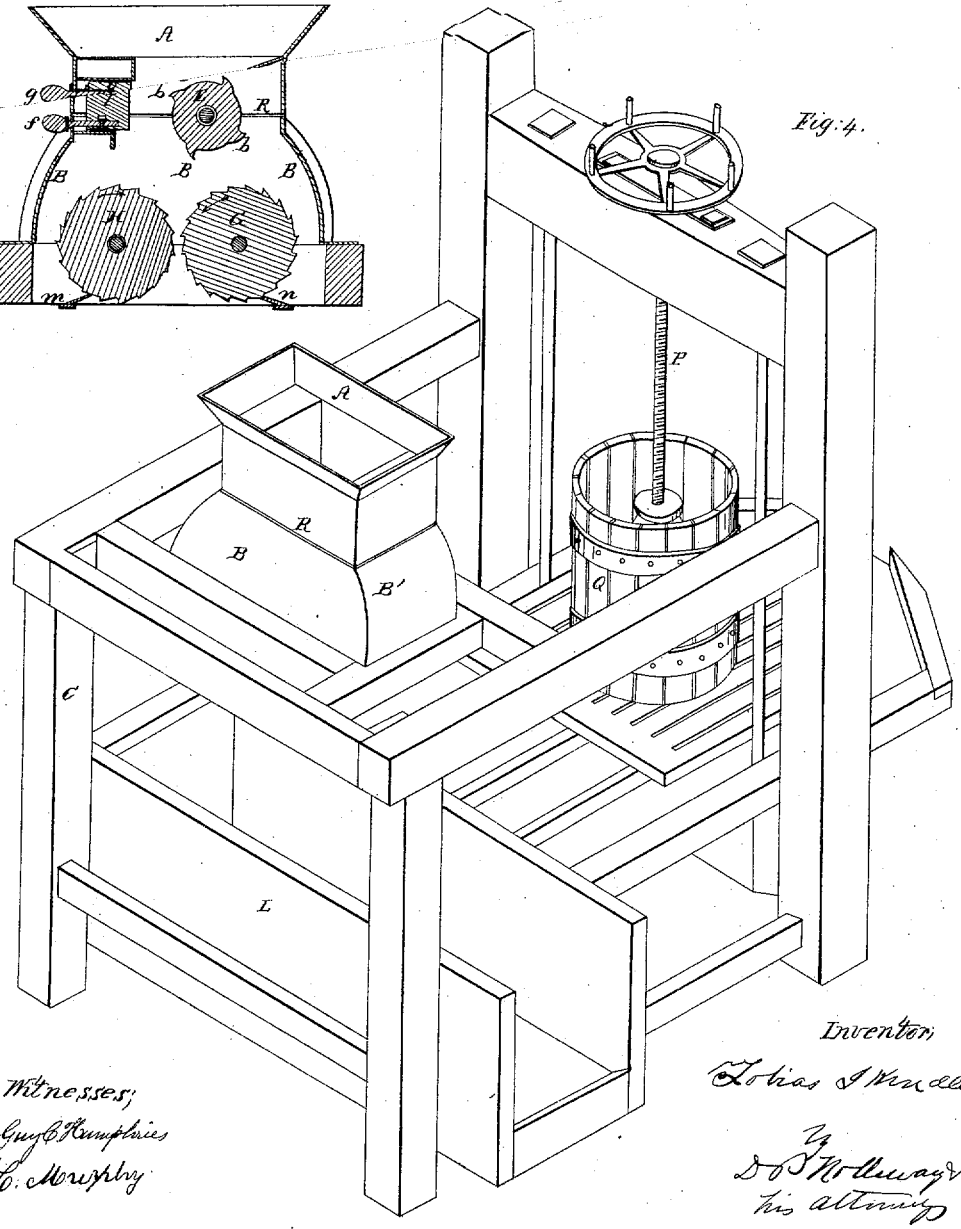

Figure 1 is a perspective view of the mill for grinding or crushing the fruit, with a portion of the frame supporting the same. Fig. 2 is a longitudinal vertical section of the hopper, showing the relative position of the rollers and adjustable throat. Fig. 3 is a plan view of the upper roller and its scraper detached; Fig. 4, a perspective view of the frame with the hopper and press mounted thereon, and showing their relative position. Fig. 5 is a longitudinal vertical section of the hopper, showing the rollers, adjustable breast, and lower scrapers in position, and also the form of the metallic ends of the hopper.

My invention has for its object the making of portable cider-mills more perfect in their operation and more compact in their form; and it consists, first, in a novel construction and arrangement of horizontal rollers for crushing the fruit; second, mounting one or both of the lower rollers so that they can be adjusted to grind coarse or fine, as may be desired; third, in an adjustable breast-piece; fourth, in a scraper to operate in connection with the upper roller; fifth, a scraper arranged to operate in connection with each of the lower rollers; sixth, in a novel arrangement of gearing; seventh, in forming the ends of the hopper of metal and giving to them a peculiar form; eighth, in providing a slatted bottom for the press-tub to stand upon; and, finally, in the combination of all these features in a compact and portable form.

To enable others skilled in the art to construct and use my invention, I will proceed to describe it.

C represents the frame, which may be made of any suitable size and form, as shown in Fig. 4. In the front part of this frame I mount the grinding-mill, which consists of a case, B, the sides of which may be made of wood, and the end pieces, B′, of which are made of metal, in the form shown in Fig. 5. Resting upon this case is the hopper A, in which is placed the fruit to be ground or crushed, the hopper A being joined to the case B at the line R, as shown in Figs. 4 and 5, in such a manner that it can be removed therefrom at pleasure.

Within the upper portion of the case B is mounted a crushing-roller, E, having longitudinal ribs *b* projecting from its surface, for the purpose of seizing and forcing the fruit against the adjustable breast-piece I, thereby crushing it more or less, as may be desired, and according to the kind of fruit used. In one end of the hopper, and opposite to this roller E, is located the breast-piece I, against which the fruit is crushed by the ribs on the roller E. This breast-piece is supported upon proper flanges or supports in such a manner that it can be moved to or from the roller E to accommodate the mill to the size and kind of fruit to be crushed, and according as it is to be ground fine or coarse. Two (more or less) screw-rods (represented by *f* and *g*) are provided, having their handles project outside of the hopper, so as to be readily operated, and so connected with the breast-piece I that the latter can be adjusted and secured in position by them at will.

In the lower portion of the case B are mounted two horizontal ribbed rollers, G and H, as shown clearly in Figs. 2 and 5. Underneath these rollers, and parallel with the faces thereof, are placed two scrapers, *m* and *n*, arranged as shown in Fig. 5, for the purpose of removing from the rollers as they revolve the adhering pomace, it being scraped off from them and dropping into the box or vat L placed underneath to receive it. A scraper, *h*, is also provided for the upper roller, O, as shown in Fig. 3. This scraper has its ends attached to the arms F, the lower ends of which are pivoted to the sides of the case B. One of said arms F is provided at its upper end, near where it is united to the scraper *h*, with a roller, O, which rests upon the periphery of a cam-wheel, D, secured upon the shaft of roller outside of the case, as shown in Fig. 1. This wheel D is provided with cams or projections on its periphery corresponding in number with the ribs on the roller E, and the wheel D being secured upon the shaft of E in such a position that the projections or cams shall come directly opposite the ribs *b* on roller E, it follows that as the ribs *b* approach the scraper *h* the latter is raised by means of the cam-wheel D operating upon the arm F, so as to permit the ribs *b* to pass the scraper *h* without being caught thereby. By these means the scraper *h* is permitted to come in contact with or near to the surface of the roller E between the ribs *b* and scrape therefrom the pomace that adheres thereto, and at the same time the scraper is prevented from catching on the ribs *b*. If desired, a spring may be used to keep the arm F in contact with the wheel D, and thus keep the scraper *h* close to the roller E, as shown in Fig. 1.

The sides of the case may be made of wood, the end pieces, B′, being made of metal, and curved, as shown, for the purpose of preventing the pomace from accumulating between the lower rollers and the ends of the case, and thereby interfering with the motion of the former.

It will be observed that the location and arrangement of the rollers are such that the fruit is first seized and partially crushed between the upper rollers, E, and the adjustable breast-piece I, from whence it drops down upon the two lower rollers, G and H, and as these rollers revolve in the direction indicated by the arrows in Fig. 5 the material is carried down between them, whereby the process of crushing or grinding it is completed. By this arrangement of the three horizontal ribbed rollers the grinding is effected in a most perfect manner.

For the purpose of adjusting the two lower rollers so as to grind more or less finely, and for the purpose of so adjusting them that grapes may be ground or crushed without crushing the seeds, (which, if done, would injure the flavor of the wine,) I mount one of said rollers in an adjustable or movable box or bearing and attach thereto a set-screw, as shown at *l*, Fig. 1, so that by turning said screw the rollers G and H may be adjusted as desired.

The grinding-mill is operated by a crank or pulley applied to the shaft of roller H, as shown in Fig. 1. Upon this shaft is also secured a spur-wheel, *o*, which gears into a smaller wheel, *m*, on the shaft of roller G, whereby the latter is caused to revolve at a greater speed than roller H, thus rubbing, tearing, and rending the pomace or fruit between them in such a manner as to entirely destroy the cellular tissue or formation of the fruit, and thereby liberate its juice to the fullest possible extent.

Upon the same shaft T of roller H is also secured a pinion, *u*, which gears into the larger spur-wheel P on the shaft of the upper roller, E. It will be observed that by this arrangement of gearing all the rollers revolve at different velocities, and that much more power is applied to the upper roller, E, by which the greater portion of the crushing is effected.

A fly-wheel is secured to the shaft of roller G on the opposite side of the case.

In machines of this class as heretofore constructed the upper roller has generally been placed at a considerable distance above and away from the lower rollers, and in consequence of such arrangement the pomace from the upper roller, instead of passing readily between the lower rollers, would accumulate upon and above them until, the hopper becoming filled, the pomace would be carried upward behind the upper roller, and thus escape from the top of the hopper, instead of being ground, as it should be, and passing through between the lower rollers. By arranging and gearing the rollers as here shown this difficulty is entirely obviated, the pomace as fast as ground by the upper roller being delivered to the lower rollers, which complete the grinding and pass it at once into the receptacle below.

For the purpose of expressing the juice from the pomace after it is ground I provide the slotted curb or tub Q and locate it upon the lower portion of the frame opposite the grinding apparatus. This curb is constructed in the usual manner, and so arranged that it can be readily moved to the box L under the mill, to be filled with pomace therefrom, when it is returned to its position at the end of the frame, underneath the screw P.

For the purpose of enabling the juice to flow more readily from the pomace I set the tub Q upon a grate, which, in turn, rests upon a series of bars or cleats secured upon the floor or bottom of the frame. By using this grate instead of a tight bottom for the tub Q the juice flows out much more readily and rapidly, and the pressing is thereby accomplished in a less time.

By thus constructing and arranging the various parts of my improved mill and press I am enabled to produce an implement that accomplishes its work in a very perfect and rapid manner, and one that is strong, light, and compact, and can therefore be readily moved about from place to place.

In cider-mills as heretofore constructed the fruit has been reduced to pomace either by simply crushing and breaking, as in the old wooden-roller mill, or by cutting, slicing, or grating. In my improved mill the fruit is reduced to pomace by the combined process of crushing and rubbing. The crushing is first done by the upper roller and the breast-piece I, the fruit being rubbed and ground against the face of the breast-piece I as it is swept past it by the ribs *b* on roller O. The process is more completely finished by the two lower rollers, one of which, moving at much greater velocity than the other, seizes a portion of the partially-ground fruit as it falls from the upper roller and presses it against the face of the adjoining roller, and rubbing it against and past it at the same time. It is by this peculiar rubbing process that the cellular formation of the fruit is completely destroyed, thus setting the juice entirely at liberty.

Having thus fully described my invention, what I claim as new, and desire to secure by Letters Patent, is—

1. A mill for grinding fruit, when constructed with three rollers, E, G, and H, the former of which is placed above the two latter, and so arranged in relation to the sides of the hopper that the fruit shall be broken by the longitudinal projections on the roller E and crushed against the breast-piece, and then delivered upon the two crushing or grinding rollers, between which the pomace passes, substantially as set forth.

2. In a cider-mill, having the three parallel rollers arranged as shown, in combination with the gearing, arranged as described, and each of the grinding rollers revolving by means of said gearing at different velocities, as set forth.

3. An adjustable breast-piece, I, or its equivalent, by which the space between it and the upper crushing-roller can be varied as desired.

4. The scraper *h*, arranged to operate in combination with the roller E, substantially as set forth.

5. Constructing the case B with concave or segmental metallic end pieces, B′, as and for the purpose set forth.

6. The use of a slatted grate or its equivalent to form the bottom of the tub or curb, for the purpose of permitting the juice to drain through it, as set forth.

In testimony whereof I have signed my name to this specification in the presence of two subscribing witnesses.

TOBIAS J. KINDLEBERGER.

Witnesses:
W. C. DOWNEY,
GEO. ARTHUR.